(12) United States Patent
Beauvy et al.

(10) Patent No.: US 12,065,223 B2
(45) Date of Patent: Aug. 20, 2024

(54) DEVICE FOR DETECTING AND GEOLOCATING A CONTAINER THAT HAS GONE OVERBOARD

(71) Applicant: SEATRACKBOX, Saint-Alban (FR)

(72) Inventors: Alain Beauvy, Saint-Alban (FR);
Thibaut Morin, Saint-Alban (FR);
Christophe Thomas, Saint-Alban (FR);
Pascal Barguirdjian, Saint-Malo (FR)

(73) Assignee: SEATRACKBOX, Saint-Alban (FR)

( * ) Notice: Subject to any disclaimer, the term of this patent is extended or adjusted under 35 U.S.C. 154(b) by 430 days.

(21) Appl. No.: 17/436,224

(22) PCT Filed: Mar. 5, 2020

(86) PCT No.: PCT/EP2020/055837
§ 371 (c)(1),
(2) Date: Sep. 3, 2021

(87) PCT Pub. No.: WO2020/182604
PCT Pub. Date: Sep. 17, 2020

(65) Prior Publication Data
US 2022/0161909 A1 May 26, 2022

(30) Foreign Application Priority Data
Mar. 12, 2019 (FR) ...................... 1902524

(51) Int. Cl.
*B63B 79/15* (2020.01)
*B63B 7/08* (2020.01)
(Continued)

(52) U.S. Cl.
CPC .............. *B63B 79/15* (2020.01); *B63B 7/082* (2013.01); *G08B 21/182* (2013.01); *B63B 2201/20* (2013.01); *G01S 19/14* (2013.01)

(58) Field of Classification Search
CPC ..... B63B 79/15; B63B 7/082; B63B 2201/20; G08B 21/182; G01S 19/14
(Continued)

(56) References Cited

U.S. PATENT DOCUMENTS 4,688,505 A * 8/1987 Yang ...................... B63B 35/28
114/256
6,074,259 A * 6/2000 Lastrajoli .................. B65F 1/14
441/1
(Continued)

FOREIGN PATENT DOCUMENTS

CN 104819742 B 10/2017
KR 20100119995 A 11/2010
(Continued)

OTHER PUBLICATIONS

Apr. 1, 2020 International Search Report issued in International Patent Application No. PCT/EP2020/055837.

*Primary Examiner* — Zhen Y Wu
(74) *Attorney, Agent, or Firm* — Williams Mullen; R. Brian Drozd (57) ABSTRACT

A device for detecting a fall of and for geolocating a container that has gone overboard that includes an electronic box and a means for removably attaching the electronic box to an external part of the container is disclosed. The electronic box includes a means for detecting the container's fall, a control unit controlling the removable attachment means in the event of the detection of the container's fall and disconnecting the electronic box from the external part of the container, a flotation means for floating the electronic box on a stretch of water, a geolocation module, a data communication means, a means for powering the control unit, a link for maintaining a permanent connection between the electronic box and container when the box is disconnected from the container. This allows detection a container (Continued)

falling into the sea and to communicate its geographical position with a view to towing thereof.

17 Claims, 5 Drawing Sheets

(51) Int. Cl.
   *G08B 21/18* (2006.01)
   *G01S 19/14* (2010.01)

(58) Field of Classification Search
   USPC .......................................... 340/8.1
   See application file for complete search history.

(56) References Cited

U.S. PATENT DOCUMENTS

| | | | | |
|---|---|---|---|---|
| 7,936,266 | B2* | 5/2011 | Francis | G09F 3/0376 340/568.1 |
| 8,998,666 | B1* | 4/2015 | Albright | B63C 9/20 340/573.6 |
| 2004/0215532 | A1* | 10/2004 | Boman | G07C 9/00 705/28 |
| 2008/0174484 | A1* | 7/2008 | Katz | G08B 21/0288 342/417 |
| 2008/0203093 | A1* | 8/2008 | Skulnick | B65D 90/22 220/239 |
| 2008/0229997 | A1* | 9/2008 | Ormaechea | B63B 43/14 114/267 |
| 2008/0252084 | A1* | 10/2008 | Francis | G09F 3/0376 700/226 |
| 2012/0252488 | A1* | 10/2012 | Hartmann | G06Q 10/08 455/456.1 |
| 2012/0299776 | A1* | 11/2012 | Lee | B63C 9/00 342/386 |
| 2015/0198950 | A1* | 7/2015 | Kallaway | B63B 27/34 701/21 |
| 2018/0065798 | A1* | 3/2018 | Numa-Beaujour | B65D 90/38 |
| 2019/0016419 | A1* | 1/2019 | Sheldon-Coulson | F03B 13/24 |

FOREIGN PATENT DOCUMENTS

| | | |
|---|---|---|
| KR | 101258643 B1 | 4/2013 |
| KR | 20160001264 U | 4/2016 |

* cited by examiner

DEVICE FOR DETECTING AND GEOLOCATING A CONTAINER THAT HAS GONE OVERBOARD

TECHNICAL FIELD

The present invention relates to a device for detecting and geolocating a container that has gone overboard while being transported by sea.

PRIOR ART

Transporting goods by sea at the present time represents more than 80% of world exchanges. However, there are a significant number of losses of containers at sea, estimated at a minimum at 10,000 losses per year.

The causes of such losses are varied and of course proportional to the number of containers transported per container ship, the latter being more and more configured for increasing their transport capacity. Among the reasons for such losses, poor weather conditions are primarily involved. Poor stowing and the state of container ships are also aggravating factors.

The dangers and the consequences of these lost containers drifting, often referred to as UFOs (unidentified floating objects) are always extremely worrying and may prove to be severe and grave. The most obvious dangers are collisions between containers and ships and, of course, pollution to the sea bed and coasts according to the toxicity of the materials transported.

Container-geolocation devices are available today. They are in the majority of cases in the form of beacons attached to the inside of the containers and having means for communicating their position by terrestrial or satellite network, such as GPS modules and transmitters or antennas. Many are intended for communicating, apart from the geographical positions, data such as the temperature inside the containers, their transit time or the precise detail of the transit. Other container geolocation devices are designed to be attached outside the container, on a region of one of the walls.

The devices proposed are not entirely satisfactory in the event of the container falling overboard. This is because, depending on the position in which the container is located in the water, these devices are no longer able to transmit their position, since the transmitter is located under the water and unable to transmit. In addition, in many cases, it would be useful to receive the geolocation data only when the container has gone overboard rather than continuously.

Finally, a device for detecting and geolocating a container that has gone overboard should also be able to be attached to a container without damaging the structure, i.e. without piercing the walls, or interfering with opening or handling.

DISCLOSURE OF THE INVENTION

One object of the present invention is to propose a device for detecting and geolocating a container that has gone overboard while it is being transported by sea that does not have the drawbacks of the devices of the prior art, in particular that makes it possible to effectively and reliably detect the fall of the container while it is being transported and geolocation thereof, which is capable of communicating information, in particular geolocation information, throughout the period during which the container may be recovered, and which can be installed without damaging the container, or interfering with opening or handling.

For this purpose, a device for detecting the fall of and geolocating a container that has gone overboard is proposed, comprising:

an electronic box and a means for removably attaching the electronic box to an external part of the container, the electronic box comprising a means for detecting the fall of the container, a control unit designed to control the removable detachment means in the event of a fall of the container being detected and disconnecting the electronic box from the external part of the container, a flotation means for making said electronic box float on a stretch of water, a geolocation module, a data communication means, and a means for powering the control unit, the device also comprising a means for maintaining a permanent connection between the electronic box and the container when the box is disconnected from the container.

The device according to the invention is therefore designed to be attached to a container intended to be transported by sea. By virtue of its removable attachment means, and in the event of the container falling, the electronic box separates from the container and is thus floating in proximity to the container, to which it remains attached by a link. In this flotation state, the device can send data and therefore transmit geolocation data (latitude; longitude).

Thus, whatever the face of the container to which it was initially attached, the device can send its coordinates, and whether this face is submerged or immersed has no effect, unlike the devices of the prior art.

Advantageously, the tie between the electronic box and the container is in the form of one or more cables of predetermined length.

According to a first embodiment, the removable attachment means comprises two jacks extending on either side of the electronic box, each comprising a portion able to at least partially surround a locking bar of the container door so as to hold the device between two locking bars, at least one of said jacks being controlled by the control unit alternately to retract or elongate so as either to hold the box between the locking bars or to release said portions of the locking bar.

According to this embodiment, the cable is attached by one of the ends thereof to one of said locking bars and by the other end to the electronic box.

According to a second embodiment, the device comprises an electromagnet attached to the electronic box and a base designed to be attached, by gluing and/or magnetisation, to a wall of the container, the electromagnet being controlled by the control unit to create an attraction between the electronic box and the base or to break the attraction, thus forming the removable connection means.

According to this embodiment, the cable is attached by one of the ends thereof to the base and by the other end to the electronic box.

Advantageously, the means for detecting the fall of the container comprises an accelerometer.

Preferentially, it is a triaxial accelerometer.

Preferentially again, the means for detecting the fall of the container also comprises at least one other parameter sensor such as a gyroscope, an inertial sensor, a vibration sensor, a speed sensor, an inclinometer, a pressure sensor, a salinity sensor or a liquid sensor, or the combination of two or more of said sensors.

Advantageously, the means for detecting a fall of the container comprises an accelerometer and an inclination detector.

Advantageously, the communication means comprises one or more antennas, preferentially attached to the flotation means.

According to one embodiment, the flotation means is an inflatable structure that is housed in a deflated state in or on the electronic box and the inflation of which is controlled by the control unit.

According to another embodiment, the flotation means is a casing or a shell inside which the electronic box is housed.

According to another embodiment, the device comprises a means for detecting sabotage of the device, preferentially composed of a magnetic alarm or an alarm comprising a magnet.

The invention also relates to a method for detecting a fall of and for geolocating a container that has gone overboard by means of a device as described in one of the preceding claims, the method comprising the following steps:
- installing said device on an external part of a container,
- monitoring, by the control unit, acceleration data supplied by an accelerometer and comparing such data with a predetermined threshold value,
- determining, by the control unit, a state of fall of the container,
- controlling, by the control unit, the disconnection of the electronic box from the external part of the container when the acceleration value is above the predetermined threshold value,
- deploying the link maintaining a permanent connection between the electronic box of the device and the container, and
- controlling, by the control unit, the sending of the geolocation data.

Advantageously, the method also comprises a step of inflating the flotation means after, or concomitantly with, the disconnection of the electronic box from the external part of the container.

Advantageously, the method also comprises monitoring, by the control unit, the value of parameters supplied by an inclinometer, a gyroscope, an inertial sensor, a vibration sensor, a speed sensor, an inclinometer, a pressure sensor, a salinity sensor or a liquid sensor, or the combination of two or more of said sensors, and comparing such data with a predetermined value.

Advantageously again, controlling, by the control unit, the disconnection of the electronic box from the external part of the container takes place when the value of at least one parameter other than that of acceleration represents a fall of the container.

Advantageously, the method also comprises a step of determining, by the control unit, sabotage of the device and a step of controlling, by the control unit, the sending of alarm information.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
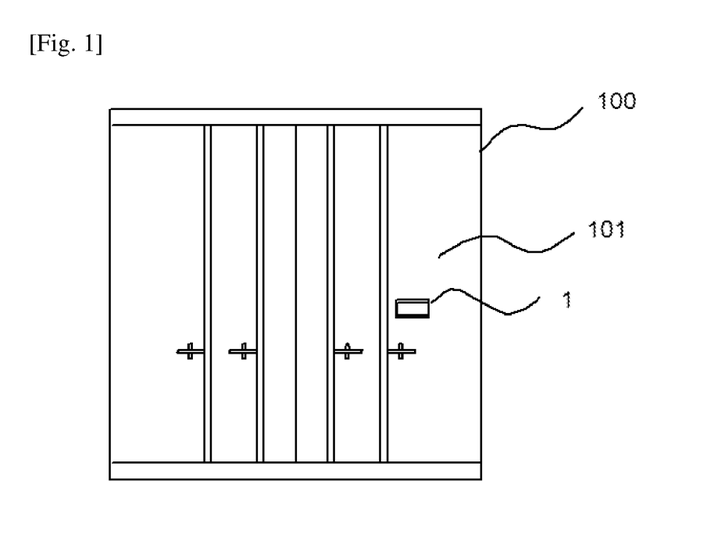
FIG. 1 is a front view of a device according to a first embodiment of the invention, installed on a container.
Figure 2:
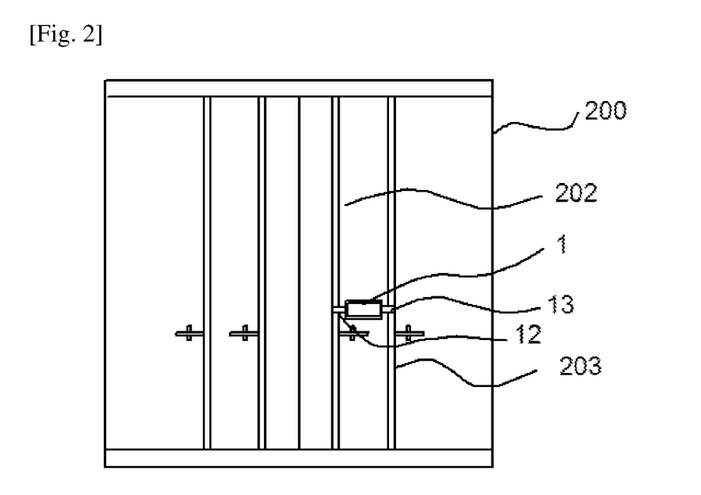
FIG. 2 is a front view of a device according to a second embodiment of the invention, installed on a container.

FIGS. 1 and 2 show containers 100 and 200 intended to be transported by sea on board a container ship. A device 1 according to the invention for detecting a fall of the container overboard and geolocating the container is attached to each of the containers 100 and 200.

The device 1 is thus intended to detect the container going overboard and falling into the sea and then supplying alert and geolocation information to persons on land or sailing in a sea area close to the geographical location of the container.

Figure 3:
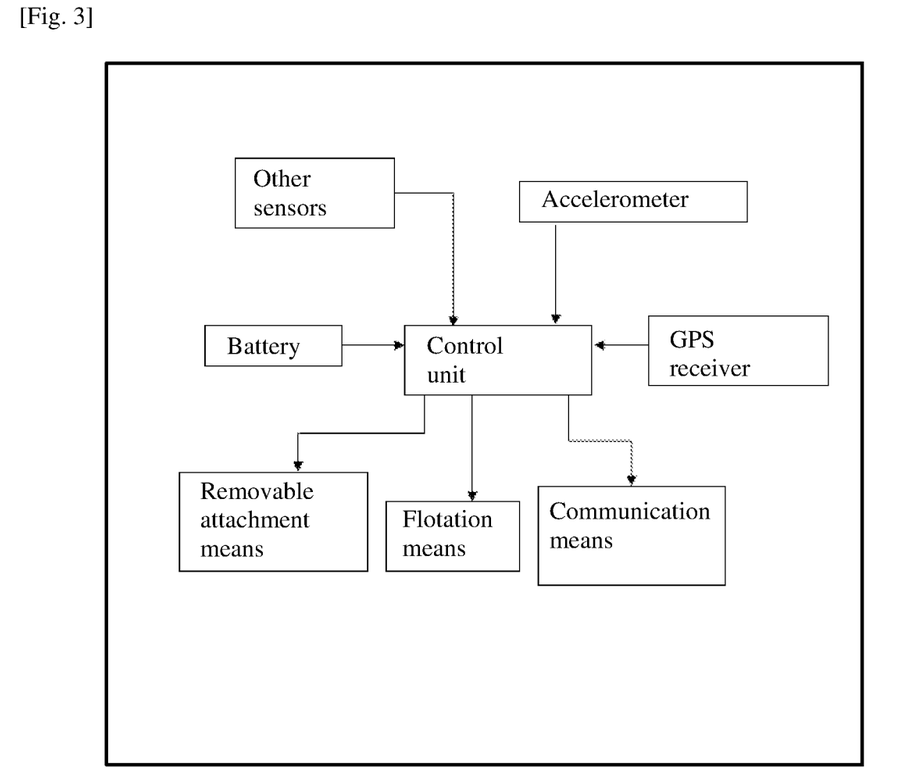
FIG. 3 is a diagram of an electronic box of a device according to the invention.

FIG. 3 shows a block diagram illustrating a device 1 for detecting a fall and geolocating a container that has gone overboard as illustrated in FIG. 1.

The device 1 comprises an electronic box 2 comprising an accelerometer 3 that measures an acceleration, a control unit 4, a battery 5, a geolocation module 6 and a communication means 7 for communicating geolocation data.

Other sensors may also be provided, such as a gyroscope, an inertial sensor, a vibration sensor, a speed sensor, an inclinometer, a pressure sensor, a salinity sensor or a liquid sensor, or a combination of two or more of said sensors.

The device 1 also comprises a means for removably attaching the device 1 on the container 100, as well as a flotation means provided for floating the electronic box 2 on the stretch of water.

The control unit 4 may be a microcontroller or a microprocessor. It receives acceleration data and can detect an acceleration representing a fall of the container 100, 200 out of the container door into a stretch of water.

The control unit 4 is designed to control the removable attachment means and to disconnect the device 1 from the container 100, 200 if a fall of the container 100 is detected. It also controls the flotation means designed to float the electronic box 2 on the stretch of water, the geolocation system 6 and the geolocation-data communication means 7.

The device 1 can be installed on any external part of the containers 100, 200, for example on a part of the wall 101 of the container 100 (FIG. 1) or between the locking bars 202, 203 of the container 200 (FIG. 2). In both cases, the device 1 does not interfere with the rotation of the locking bars and does not prevent opening of the containers 100, 200.

The device 1 is thus attached to a container by a removable attachment means, two variants of which are illustrated on FIGS. 4 to 8.

Figure 4:
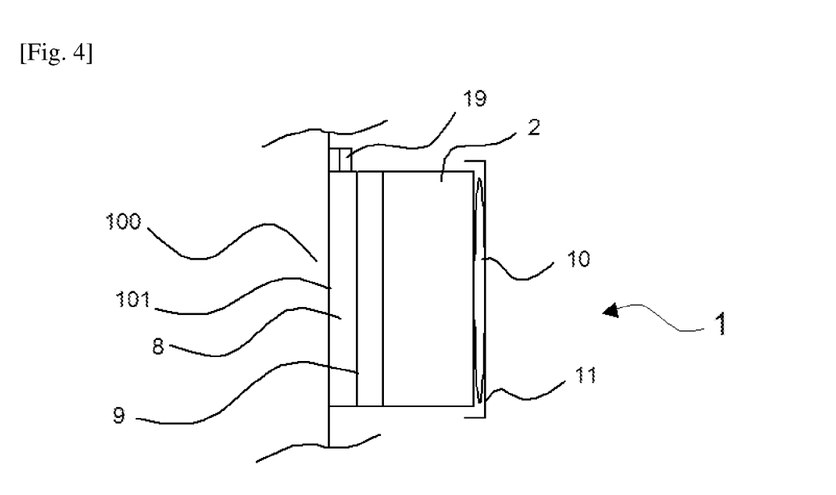
FIG. 4 is a profile view of a device according to the first embodiment of the invention, installed on a container.

Thus FIG. 4 shows a device 1 according to a first embodiment of the invention, seen in profile, the electronic box 2 of which is attached to the wall 101 of the container 100 by means of an attachment means including a base 8 and an electromagnet 9. The base 8 is attached by gluing or by magnetisation. No piercing if the wall 101 is necessary. The electromagnet 9, controlled by the control unit 4, maintains an attraction between the base 8 and the electronic box 2.

A flotation means that is an inflatable structure 10 is attached or linked to the device 1. This inflatable structure 10 is in the deflated state and is protected by a cover 11. Inflation thereof is controlled by the control unit 4.

Alternatively, the flotation means may be a casing or a shell protecting the electronic box 2.

Figure 6:
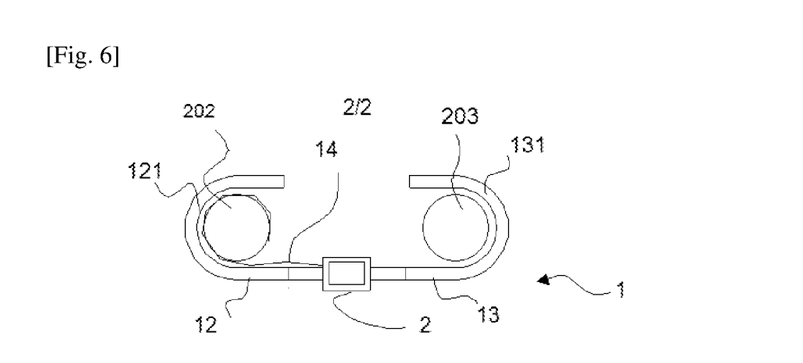
FIG. 6 is a plan view of a device according to the second embodiment of the invention, installed on a container.

FIG. 6 shows a device 1 according to a second embodiment of the invention, seen from above, the electronic box 2 of which is attached between the locking bars 202, 203 of the container 200 by means of an attachment means including jacks 12 and 13. Each jack 12, 13 comprises a portion 121, 131 able to at least partially surround a locking bar 202, 203, respectively, of the door of the container 200 so as to hold the device 1 between two locking bars. At least one of the jacks 12 is actuated by the control unit 4 to retract so as to grip the locking bar 202.

The device 1, according to this embodiment, also comprises an inflatable structure 10, here in the deflated state and protected by a cover 11.

As long as a container 100 or 200 is located on the container ship, the device 1 is in a so-called "standby" state, wherein in particular the geolocation module and the communication means are not active. In this state also, the electromagnet 9 maintains the attachment of the electronic box 2 on the base 8 of the container 100, where the jacks 12 and 13 are retracted around the locking bars 202 and 203 of the container 200.

The accelerometer permanently measures any accelerations undergone by the device 1 and communicates the acceleration data to the control unit 4.

The acceleration is preferably measured according to a plurality of distinct axes. In this regard, a triaxial accelerometer is preferred.

The control unit 4 compares the acceleration data that it receives with a predetermined reference threshold value. If an acceleration data item is above this threshold value, then the control unit detects a state of fall of the container into the water.

The device then goes into a so-called "active" state.

The control unit 4 then, by means of the removable attachment means, demands the disconnection of the electronic box 2 and the container 100 or 200.

Figure 5:
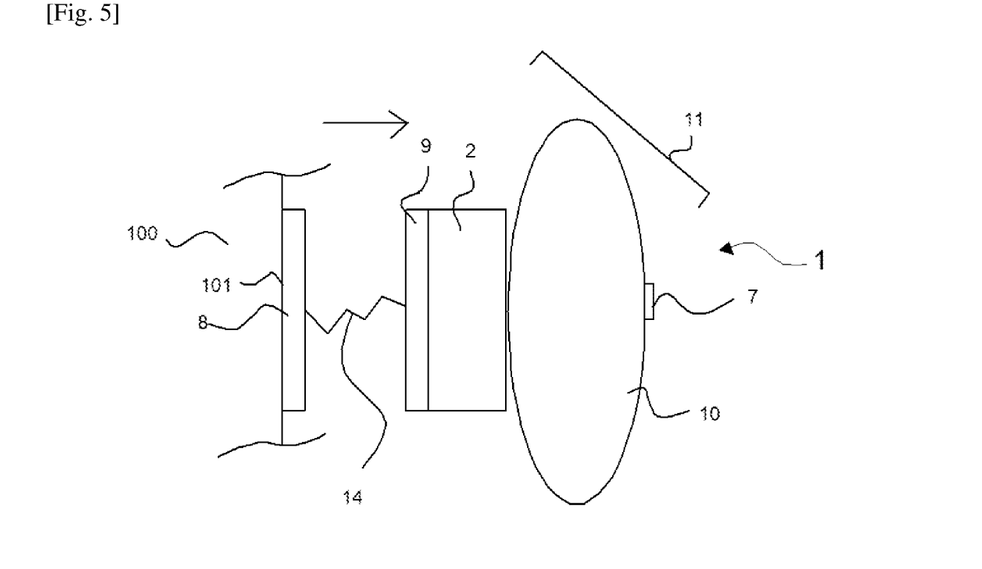
FIG. 5 is a profile view of a device according to the first embodiment of the invention, detaching from a container at the time of a fall.

To do this, according to the first embodiment described in relation to FIGS. 4 and 5, the attraction between the electromagnet 9 and the base 8 is broken by command of the control unit 4.

Figure 7:
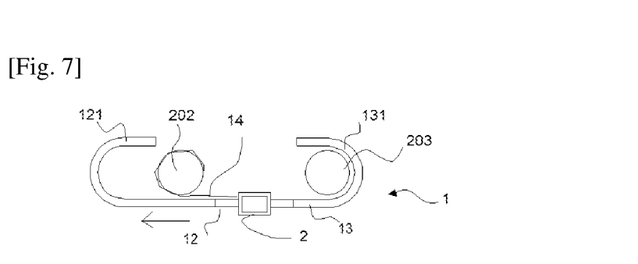
FIG. 7 is a plan view of a device according to the second embodiment of the invention, detaching from a container at the time of a fall.
Figure 8:
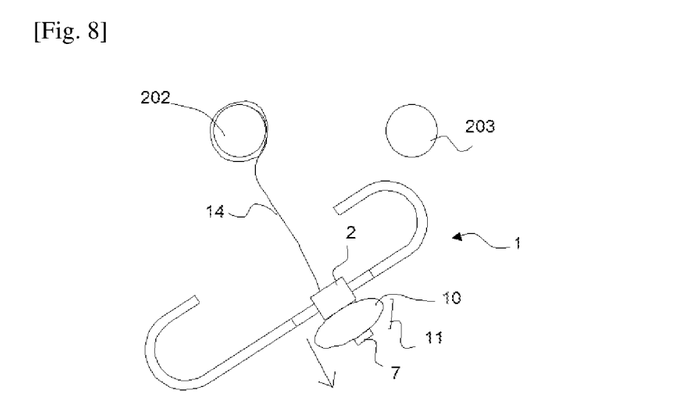
FIG. 8 is a plan view of a device according to the second embodiment of the invention, detaching from a container at the time of a fall.

According to the second embodiment described in relation to FIGS. 6 to 8, the jack 12 extends by command of the control unit 4 in order to release the portion of the locking bar 202.

Afterwards, or concomitantly with the disconnection of the electronic box 2 from the container 100 or from the container 200, the control unit 4, by means of a striking pin, controls the inflation of the flotation means 10 (FIGS. 5 and 8).

Figure 9:
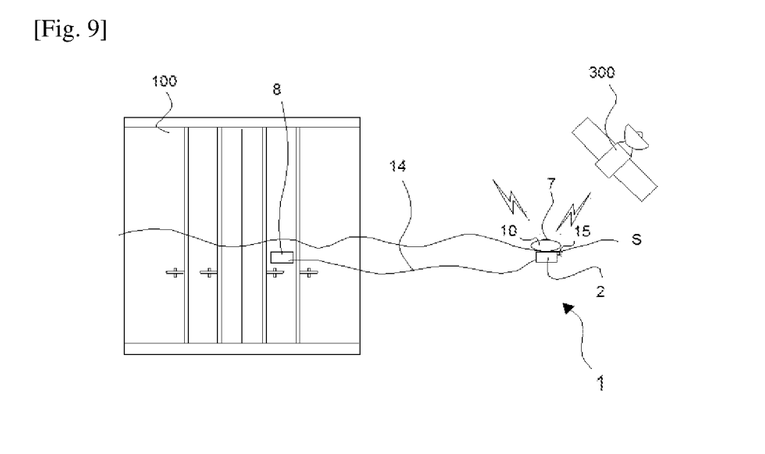
FIG. 9 is a view illustrating a device according to one or other of the first and second embodiments floating after a fall.

FIG. 9 illustrates a container, for example the container 100, that has gone overboard and has fallen into the water. The electronic box 2 is therefore floating on the surface of the water S, in proximity to the container 100.

So as to maintain a permanent link between the electronic box 2 and the container 100 or 200, a cable 14, of a predetermined length, for example between 1 and 20 metres, is provided for connecting the two.

According to the first embodiment, the cable 14 is attached by one of the ends thereof to the base 8 and by the other end to the electronic box 2 (FIG. 5).

According to the second embodiment, the cable 14 is attached by one of the ends thereto to one of the locking bars 202, 203 and by the other end to the electronic box 2 (FIG. 8).

The electronic box 2 therefore floats on the surface of the water by virtue of the flotation means 10 and is connected to the container 100 by the cable 14 (FIG. 9).

Afterwards, or concomitantly with the disconnection of the electronic box 2 from the container 100 or 200, and concomitantly with the inflation of the flotation means 10, the control unit 4 controls the geolocation module 6, the reception of geolocation data by means of a GPS receiver and the transmission of this information by the communication means 7 to land or to sea vessels moving essentially in the same geographical area.

The GPS receiver and the communication means 7 are advantageously one and the same means, for example one or more antennas 7.

According to the invention, the antennas 7 are located on a part of the device 1 that is not submerged. They may be placed on the flotation means 10 or in the part of the electronic box 2 that is located facing the flotation means.

The antennas 7 communicate by cellular network and/or satellite network 300, in particular Iridium, GLONASS or Galileo.

In the embodiment illustrated in FIG. 9, it will be noted that the base 8 is submerged so that, if the electronic box 2 were not disconnected from the base 8, it would not be able to transmit its geolocation data, itself being submerged.

The transmission of the geolocation data takes place continuously or at regular intervals, for example every quarter of an hour.

Apart from the geolocation information, the communication means can transmit other information such as the identification of the container, by means of a pre-recorded identification code, or the charge level of the battery.

Other parameter sensors may be provided so as to reinforce or confirm the fall of the container 100, 200 into the water (FIG. 3). In this case, the data obtained from these sensors can, in addition to those of the accelerometer, be used by the control unit for detecting the state of fall of the container into the water and to make the device go into its so-called "active state", wherein it separates from the container and transmits its location.

The inclination sensor, such as a gyrometer, can in particular be used for measuring the inclination experienced by the device with respect to the horizon line when the container falls. In this case, the control unit will detect a state of fall into the water according to the values measured both by the accelerometer and the inclination sensor, i.e. an acceleration and one or more angles greater than predetermined threshold values.

A gyrometer sensor can also serve to confirm that the container is undergoing roll or pitching. This embodiment may be useful for example for distinguishing a fall of the container on land rather than at sea. When the container falls on land, for example on the dock during handling, it undergoes an acceleration but is then in a state of stability, and undergoes neither roll nor pitching. In this case, the accelerometer will effectively measure an acceleration greater than the predetermined threshold value representing a fall. However, since the data obtained from the gyrometer do not represent roll or pitching, the control unit will not detect the state of fall of the container into the water and will not demand disconnection of the electronic box from the external part of the container, or the inflation of the flotation means, or the geolocation module.

A liquid detector may also be used in addition to the accelerometer for confirming that the container is in the water. It will be a liquid detector based on a capacitive sensor. It will make it possible to measure a liquid level with precision. In this case, the control unit will detect a state of fall into the water according to values measured both by the accelerometer and the liquid detector, i.e. an acceleration and a liquid level above predetermined threshold values.

A speed sensor may also be used so as to know the speed at which the container is drifting. In this case, the speed data are not taken into account by the control unit for detecting a state of fall, but they are transmitted at the same time as the geolocation data.

The device is provided with a rechargeable battery 5, having a life of several days, for example up to 15 days. Photovoltaic cells may be provided on the device 1 so as to recharge the battery 5.

The device 1 may in addition comprise a light-emission system, in particular by light flash 15, so as to facilitate location thereof.

Finally, the device 1 may in addition comprise an automatic identification system (AIS), so as to communicate messages to ships including the position, the identification and the status of the container. This system is controlled by the control unit 4 as soon as the container is in the water. The AIS system comprises transmitters that will advantageously be positioned in proximity to the antennas 7.

Figure 10:
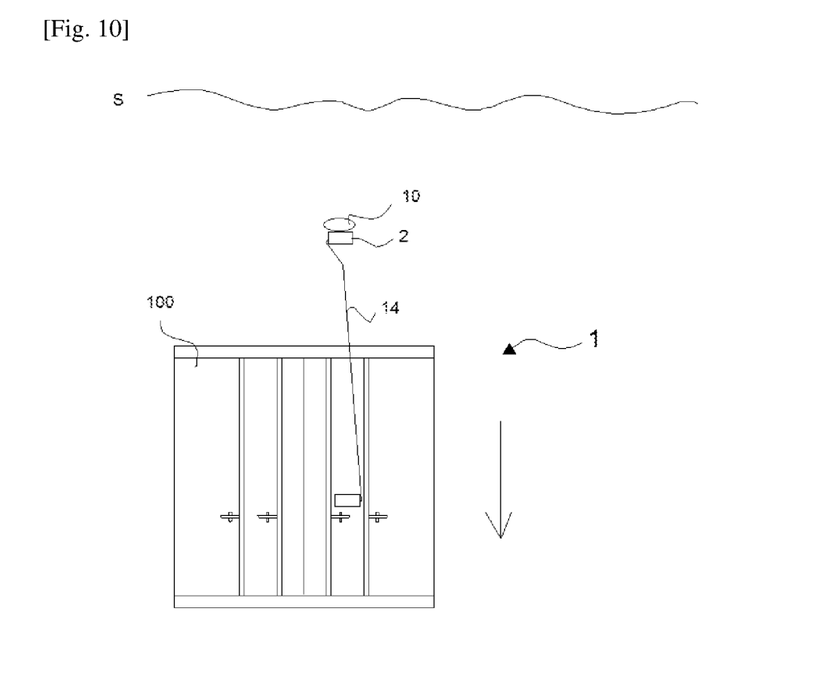
FIG. 10 is a view illustrating a device according to one or other of the first and second embodiments once the container has sunk.

The container 100 may drift and float for several weeks. During this interval of time, the device 1 will transmit geolocation data so as to enable the container to be recovered. Following these few weeks, the container 100 will sink and drag with it, to the sea bed, the electronic box 2, which will cease to transmit (FIG. 10).

According to one embodiment of the invention, the device 1 may include a means for detecting sabotage to detect the case where an individual would forcibly separate the device 1 from the container 100 or 200. It will be a magnetic alarm 19 according to which a magnetic field is created between the electronic box 2 and the container 100 (FIG. 4). If the magnetic field is broken, then the information is detected by the control unit 4, which will demand the transmission of alert information. Alternatively, the alarm may be hard wired or composed of a magnet.

The invention claimed is:

1. A device for detecting a fall of and for geolocating a container that has gone overboard, the device comprising:
    an electronic box,
    a means for removably attaching the electronic box to an external part of the container,
    a means for detecting the fall of the container,
    a control unit designed to control the removable attachment means in the event of a fall of the container being detected and disconnecting the electronic box from the external part of the container,
    a flotation means for making said electronic box float on surface of water,
    a geolocation module,
    a data communication means,
    a means for powering the control unit, and
    a link for maintaining a permanent connection between the electronic box and the container when the electronic box is disconnected from the container,
    wherein the removable attachment means comprises two jacks extending on either side of the electronic box, each jack of the two jacks comprising a portion able to at least partially surround a locking bar of a door of the container so as to hold the device between two locking bars, at least one of said jacks being controlled by the control unit alternately to retract or extend so as either to hold the electronic box between two locking bars or to release said portions from the locking bar.

2. The device according to claim 1, wherein the link between the electronic box and the container is in the form of one or more cables of predetermined length.

3. The device according to claim 2, wherein said cable is attached by one of the ends thereof to one of said locking bars and by the other end to the electronic box.

4. The device according to claim 1, further comprising an electromagnet attached to the electronic box and a base designed to be attached, by gluing and/or magnetisation, to a wall of the container, the electromagnet being controlled by the control unit to create an attraction between the electronic box and the base or to break the attraction, thus forming the removable connection means.

5. The device according to claim 4, wherein a cable is attached by one of the ends thereof to the base and by the other end to the electronic box.

6. The device according to claim 1, wherein the means for detecting the fall of the container comprises an accelerometer.

7. The device according to claim 6, wherein the means for detecting the fall of the container also comprises at least one other parameter sensor such as a gyroscope, an inertial sensor, a vibration sensor, a speed sensor, an inclinometer, a pressure sensor, a salinity sensor or a liquid sensor, or the combination of two or more of said sensors.

8. The device according to claim 6, wherein the means for detecting a fall of the container comprises an accelerometer and an inclination detector.

9. The device according to claim 1, wherein the communication means comprises one or more antennas, preferentially attached to the flotation means.

10. The device according to claim 1, wherein the flotation means comprises an inflatable structure that is housed in a deflated state in or on the electronic box and the inflation of which is controlled by the control unit.

11. The device according to claim 1, wherein the flotation means comprises a casing or a shell inside which the electronic box is housed.

12. The device according to claim 1, wherein the device comprises a means for detecting sabotage of the device, preferentially composed of a magnetic alarm or an alarm comprising a magnet.

13. A method for detecting a fall of and for geolocating a container that has gone overboard, the method comprising:
    installing said device according to claim 1 on an external part of a container,
    monitoring, by the control unit, acceleration data supplied by an accelerometer and comparing such data with a predetermined threshold value,
    determining, by the control unit, a state of fall of the container,
    controlling, by the control unit, disconnection of the electronic box from the external part of the container when an acceleration value of the acceleration data is above the predetermined threshold value, deploying a link maintaining a permanent connection between the electronic box of the device and the container, and controlling, by the control unit, the sending of the geo-location data.

14. The method according to claim 13, further comprising inflating the flotation means after, or concomitantly with, the disconnection of the electronic box from the external part of the container.

15. The method according to claim 14, further comprising monitoring, by the control unit, a value of parameters supplied by an inclinometer, a gyroscope, an inertial sensor, a vibration sensor, a speed sensor, an inclinometer, a pressure sensor, a salinity sensor or a liquid sensor, or the combination of two or more of said sensors, and comparing such data with a predetermined value.

16. The method according to claim 15, wherein the controlling, by the control unit, the disconnection of the electronic box from the external part of the container takes place when a value of at least one parameter other than that of acceleration represents a fall of the container.

17. The method according to one of claim 14, further comprising determining, by the control unit, sabotage of the device and a step of controlling, by the control unit, the sending of alarm information.

* * * * *